United States Patent
Yang et al.

(10) Patent No.: US 9,673,940 B2
(45) Date of Patent: *Jun. 6, 2017

(54) METHOD FOR TRANSMITTING/RECEIVING SIGNAL AND DEVICE THEREFOR

(71) Applicant: LG ELECTRONICS INC., Seoul (KR)

(72) Inventors: Suckchel Yang, Anyang-si (KR); Joonkui Ahn, Anyang-si (KR); Dongyoun Seo, Anyang-si (KR); Mingyu Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/060,918

(22) Filed: Mar. 4, 2016

(65) Prior Publication Data

US 2016/0191213 A1   Jun. 30, 2016

Related U.S. Application Data

(63) Continuation of application No. 14/005,221, filed as application No. PCT/KR2012/001886 on Mar. 15, 2012, now Pat. No. 9,313,776.

(Continued)

(51) Int. Cl.
*H04J 3/00*    (2006.01)
*H04L 1/18*    (2006.01)
*H04W 72/04*   (2009.01)

(52) U.S. Cl.
CPC .......... *H04L 1/1864* (2013.01); *H04L 1/1822* (2013.01); *H04L 1/1861* (2013.01);
(Continued)

(58) Field of Classification Search
CPC ..... H04L 5/0055; H04L 5/001; H04L 5/0053; H04L 5/0048; H04L 1/1861;
(Continued)

(56) References Cited

U.S. PATENT DOCUMENTS

2010/0195586 A1   8/2010   Choi et al.
2010/0195629 A1   8/2010   Chen et al.
(Continued)

OTHER PUBLICATIONS

Nokia, et al., "L1 control signaling with carrier aggregation in LTE-Advanced", 3GPP TSG-RAN WG1 Meeting #54bis, R1-083730, Sep. 2008, 7 pages.
(Continued)

*Primary Examiner* — Michael J Moore, Jr.
(74) *Attorney, Agent, or Firm* — Lee Hong Degerman Kang Waimey

(57) ABSTRACT

The present invention relates to a wireless communication system. More particularly, the present invention relates to a method and a device for a terminal to transmit an uplink signal according to a normal HARQ operation in a wireless communication system supporting a carrier merge, the method comprising the steps of: forming a first cell set with a FDD and a second serving cell set with a TDD; receiving a PHICH signal from a subframe #(n−m−p) of the first serving cell, or receiving a PDCCH signal from a subframe #(n−m) of the first serving cell; and transmitting a PUSCH signal from a subframe #n of the second serving cell, in correspondence to the PHICH signal or the PDCCH signal, wherein n is an integer greater than or equal to 0, m is an integer greater than or equal to 1, and p is an integer greater than or equal to 1.

10 Claims, 12 Drawing Sheets

Related U.S. Application Data

(60) Provisional application No. 61/452,647, filed on Mar. 15, 2011, provisional application No. 61/602,610, filed on Feb. 24, 2012.

(52) U.S. Cl.
CPC ........... *H04L 1/1867* (2013.01); *H04W 72/04* (2013.01); *H04W 72/042* (2013.01); *H04W 72/0413* (2013.01)

(58) Field of Classification Search
CPC ....... H04L 5/1469; H04L 5/0023; H04L 5/14; H04L 1/1812; H04L 5/0035; H04L 1/18; H04L 5/005; H04L 1/1854; H04L 1/1896; H04W 72/042
See application file for complete search history.

(56) References Cited

U.S. PATENT DOCUMENTS

| | | |
|---|---|---|
| 2011/0002276 A1 | 1/2011 | Chen et al. |
| 2011/0170499 A1 | 7/2011 | Nayeb Nazar et al. |
| 2011/0255489 A1 | 10/2011 | Zhang et al. |
| 2011/0310986 A1 | 12/2011 | Heo et al. |
| 2012/0093097 A1 | 4/2012 | Che et al. |
| 2012/0170479 A1 | 7/2012 | Ren et al. |
| 2012/0201229 A1 | 8/2012 | Feng et al. |
| 2013/0028216 A1 | 1/2013 | Baldemair et al. |
| 2013/0070693 A1 | 3/2013 | Kwon et al. |
| 2013/0094410 A1 | 4/2013 | Yang et al. |
| 2013/0102320 A1 | 4/2013 | Suzuki et al. |
| 2013/0315193 A1 | 11/2013 | Kim et al. |
| 2014/0161002 A1 | 6/2014 | Gauvreau et al. |

OTHER PUBLICATIONS

LG Electronics, "UL control channel design to support carrier aggregation", 3GPP TSG RAN WG1 #56bis, R1-091204, Mar. 2009, 6 pages.

PCT International Application No. PCT/KR2012/001886, Written Opinion of the International Searching Authority dated Oct. 4, 2012, 18 pages.

(a) PCC UL grant-SCC PUSCH relation (FDD timing)

(b) PCC UL grant-SCC PUSCH relation (TDD timing)

(a) SCC PUSCH-PCC PHICH relation (FDD timing)

(b) SCC PUSCH-PCC PHICH relation (TDD timing)

METHOD FOR TRANSMITTING/RECEIVING SIGNAL AND DEVICE THEREFOR

CROSS-REFERENCE TO RELATED APPLICATIONS

This application is a continuation of U.S. patent application Ser. No. 14/005,221, filed on Sep. 13, 2013, now U.S. Pat. No. 9,313,776, which is the National Stage filing under 35 U.S.C. 371 of International Application No. PCT/KR2012/001886, filed on Mar. 15, 2012, which claims the benefit of U.S. Provisional Application Nos. 61/452,647, filed on Mar. 15, 2011, and 61/602,610, filed on Feb. 24, 2012, the contents of which are all incorporated by reference herein in their entirety.

TECHNICAL FIELD

The present invention relates to a wireless communication system, and more specifically, to a method for transmitting/receiving a signal in a system simultaneously supporting FDD (Frequency Division Duplex) and TDD (Time Division Duplex) and a device for the same.

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as Code Division Multiple Access (CDMA), Frequency Division Multiple Access (FDMA), Time Division Multiple Access (TDMA), Orthogonal Frequency Division Multiple Access (OFDMA), or Single Carrier Frequency Division Multiple Access (SC-FDMA).

DISCLOSURE

Technical Problem

An object of the present invention devised to solve the problem lies in a method for efficiently transmitting/receiving a signal in a wireless communication system supporting TDD and a device for the same. Another object of the present invention is to provide a method for efficiently transmitting/receiving a signal in a system simultaneously supporting FDD and TDD and a device for the same.

The technical problems solved by the present invention are not limited to the above technical problems and those skilled in the art may understand other technical problems from the following description.

Technical Solution

The object of the present invention can be achieved by providing a method for transmitting an uplink signal by a UE according to a normal HARQ (hybrid automatic repeat and request) operation in a wireless communication system supporting carrier aggregation, the method including: configuring a first cell set to FDD (frequency division duplex) and a second cell set to TDD (time division duplex); receiving a PHICH (physical HARQ indicator channel) signal in a subframe #(n−m−p) of the first serving cell, or receiving a PDCCH (physical downlink control channel) signal in a subframe #(n−m) of the first serving cell; and transmitting a PUSCH (physical uplink shared channel) signal in a subframe #n of the second cell in response to the PHICH signal or the PDCCH signal, wherein n is an integer greater than or equal to 0, m is an integer greater than or equal to 1, and p is an integer greater than or equal to 1.

In another aspect of the present invention, provided herein is a UE configured to transmit an uplink signal according to a normal HARQ operation in a wireless communication system supporting carrier aggregation, the UE including a radio frequency (RF) unit and a processor, wherein the processor is configured to configure a first cell set to FDD and a second cell set to TDD, to receive a PHICH signal in a subframe #(n−m−p) of the first serving cell or receive a PDCCH signal in a subframe #(n−m) of the first serving cell, and to transmit a PUSCH signal in a subframe #n of the second cell in response to the PHICH signal or the PDCCH signal, wherein n is an integer greater than or equal to 0, m is an integer greater than or equal to 1, and p is an integer greater than or equal to 1.

The PHICH signal, the PDCCH signal and the PUSCH signal may correspond to the same HARQ process.

The subframes #(n−m−p), #(n−m) and #n may be allocated to the same HARQ process.

2m+1 may correspond to an RTT of a HARQ process.

Preferably, m may be 4 and p is 2.

Advantageous Effects

According to the present invention, a signal can be efficiently transmitted/received in a wireless communication system. Furthermore, a signal can be efficiently transmitted/received in a system simultaneously supporting FDD and TDD.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Embodiments of the present invention are applicable to a variety of wireless access technologies such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, Evolved UTRA (E-UTRA). UTRA is a part of Universal Mobile Telecommunications System (UMTS). 3$^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) is an evolution of 3GPP LTE.

While the following description is given, centering on 3GPP LTE/LTE-A to clarify the description, this is purely exemplary and thus should not be construed as limiting the present invention.

Figure 1:
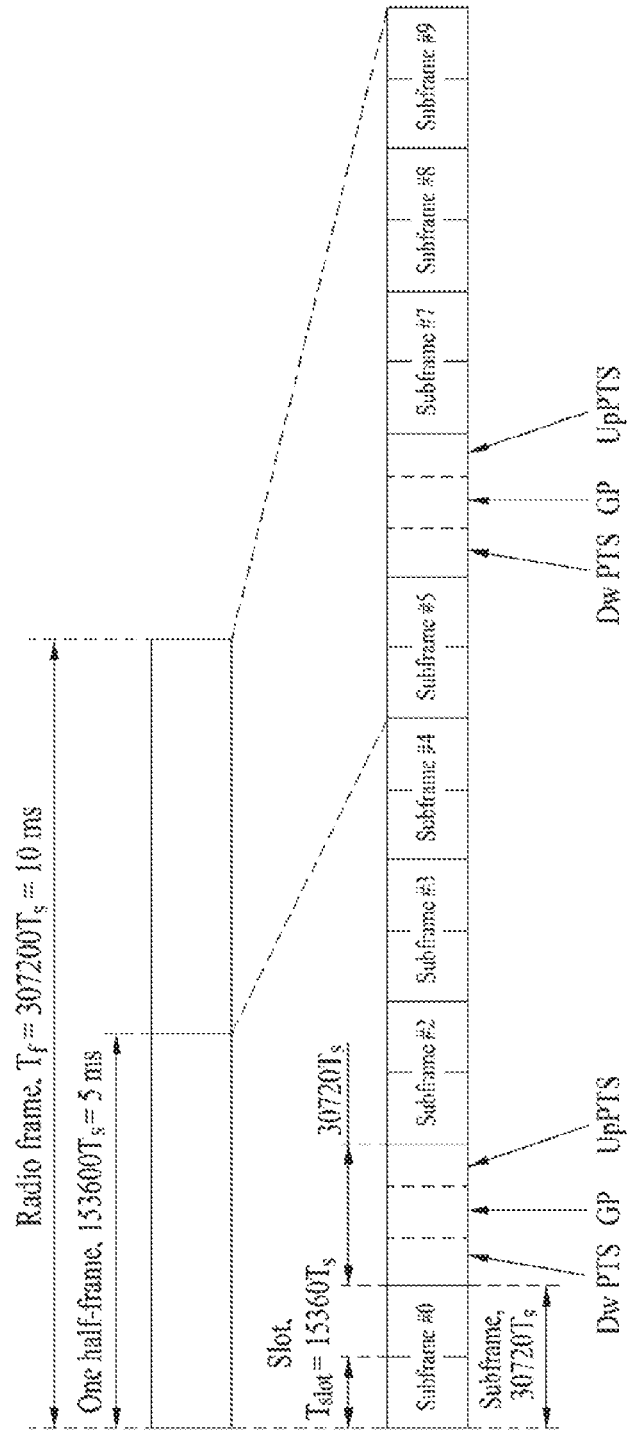
FIG. 1 illustrates a radio frame structure.

FIG. 1 illustrates a radio frame structure.

Referring to FIG. 1, a radio frame used in 3GPP LTE(-A) has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD (Frequency Division Duplex) mode, and thus the radio frame includes only one of a downlink subframe and an uplink subframe in a specific frequency band.

Particularly, FIG. 1 shows a radio frame structure for TDD, used in 3GPP LTE(-A). Table 1 shows UL-DL configurations of subframes in a radio frame in the TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| Special subframe configuration | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 2:
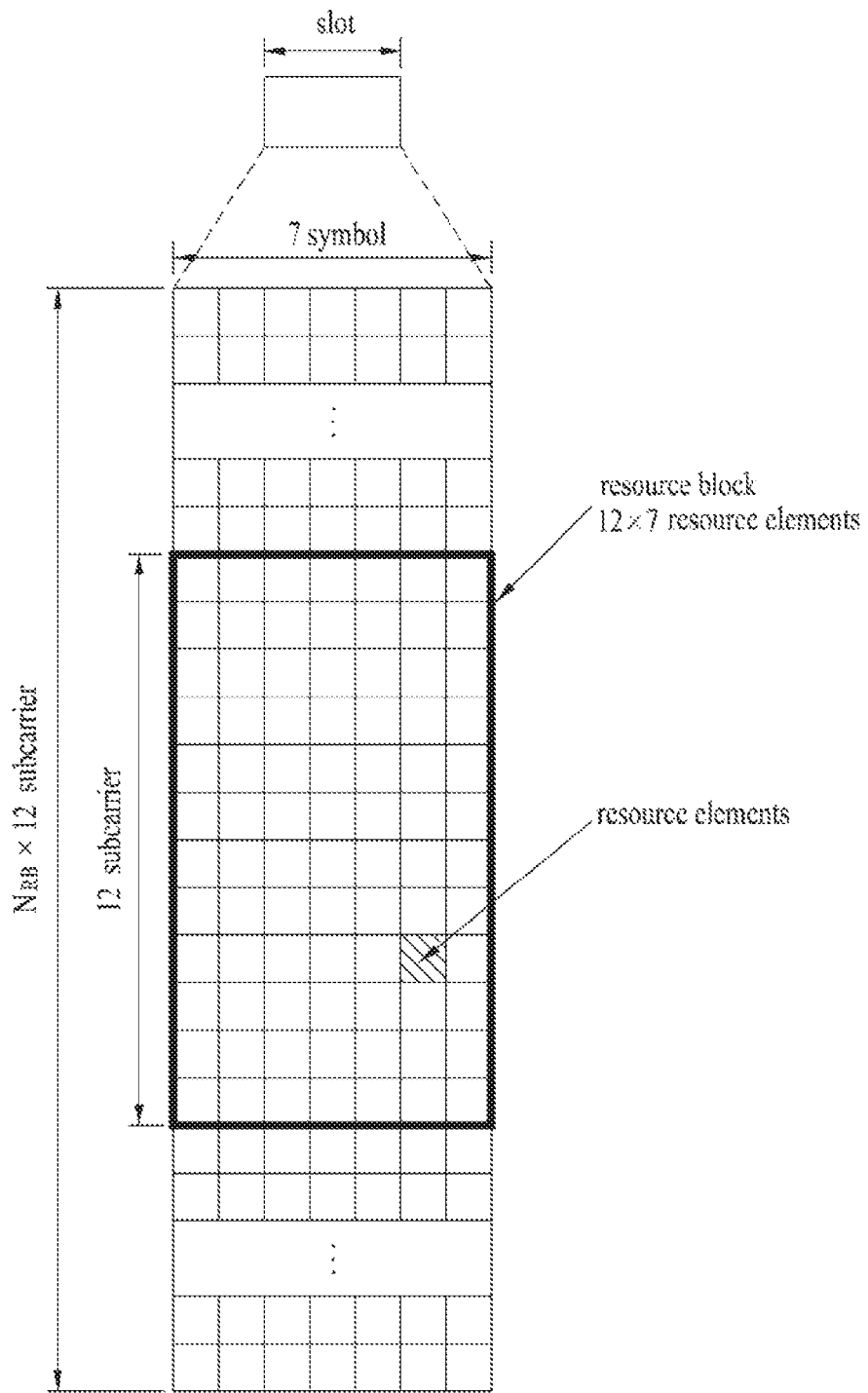
FIG. 2 illustrates a resource grid of a downlink slot.

FIG. 2 illustrates a resource grid of a downlink slot.

Referring to FIG. 2, a downlink slot includes a plurality of OFDM symbols in the time domain. One downlink slot may include 7(6) OFDM symbols, and one resource block (RB) may include 12 subcarriers in the frequency domain. Each element on the resource grid is referred to as a resource element (RE). One RB includes 12×7(6) REs. The number $N_{RB}$ of RBs included in the downlink slot depends on a downlink transmit bandwidth. The structure of an uplink slot may be same as that of the downlink slot except that OFDM symbols by replaced by SC-FDMA symbols.

Figure 3:
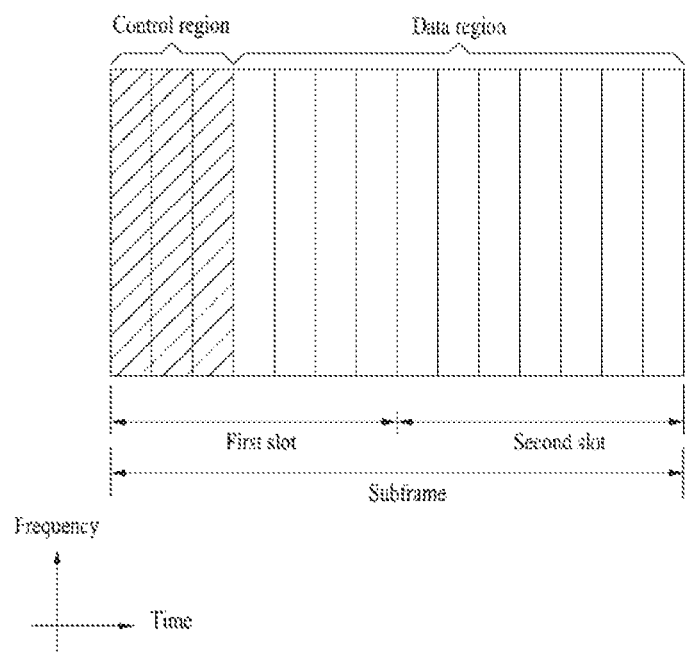
FIG. 3 illustrates a downlink subframe structure.

FIG. 3 illustrates a downlink subframe structure.

Referring to FIG. 3, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. A PDSCH is used to carry a transport block (TB) or a codeword (CW) corresponding to the TB. The TB means a data block transmitted from a MAC layer to a PHY layer through a transport channel. The codeword corresponds to a coded version of a TB. The corresponding relationship between the TB and the CW depends on swiping. In the specifically, the PDSCH, TB and CW are interchangeably used. Examples of downlink control channels used in LTE(-A) include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/not-acknowledgment (NACK) signal. A HARQ-ACK response includes positive ACK (simply, ACK), negative ACK (NACK), DTX (Discontinuous Transmission) or NACK/DTX. Here, HARQ-ACK is used with HARQ ACK/NACK and ACK/NACK interchangeably.

Control information transmitted through the PDCCH is referred to as downlink control information (DCI). The DCI includes resource allocation information for a UE or a UE group and other control information. For example, the DCI includes uplink/downlink scheduling information, an uplink transmit (Tx) power control command, etc. Transmission modes and information content of DCI formats for configuring a multi-antenna technology are as follows.

Transmission Mode
  Transmission mode 1: Transmission from a single base station antenna port
  Transmission mode 2: Transmit diversity
  Transmission mode 3: Open-loop spatial multiplexing
  Transmission mode 4: Closed-loop spatial multiplexing
  Transmission mode 5: Multi-user MIMO
  Transmission mode 6: Closed-loop rank-1 precoding
  Transmission mode 7: Transmission using UE-specific reference signals
DCI Format
  Format 0: Resource grants for the PUSCH transmissions (uplink)
  Format 1: Resource assignments for single codeword PDSCH transmissions (transmission modes 1, 2 and 7)
  Format 1A: Compact signaling of resource assignments for single codeword PDSCH (all modes)
  Format 1B: Compact resource assignments for PDSCH using rank-1 closed loop precoding (mod 6)
  Format 1C: Very compact resource assignments for PDSCH (e.g. paging/broadcast system information)
  Format 1D: Compact resource assignments for PDSCH using multi-user MIMO (mode 5)
  Format 2: Resource assignments for PDSCH for closed-loop MIMO operation (mode 4)
  Format 2A: Resource assignments for PDSCH for open-loop MIMO operation (mode 3)
  Format 3/3A: Power control commands for PUCCH and PUSCH with 2-bit/1-bit power adjustments As described above, the PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

Figure 4:
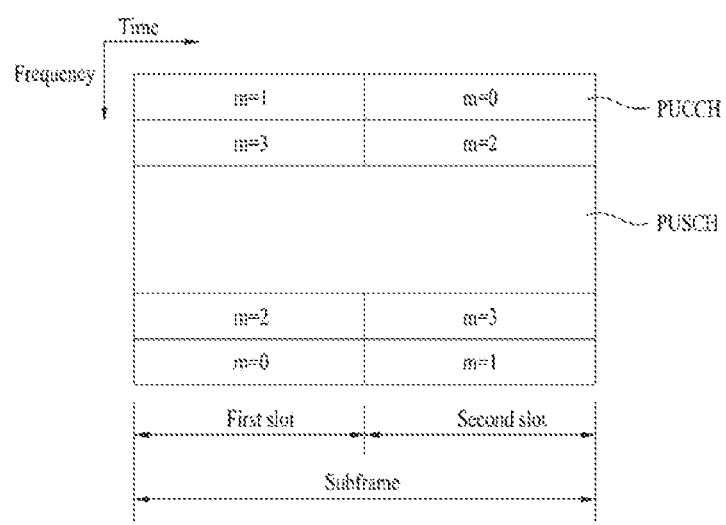
FIG. 4 illustrates an uplink subframe structure.

FIG. 4 illustrates an uplink subframe structure.

Referring to FIG. 4, an uplink subframe includes a plurality of (e.g. 2) slots. A slot may include different numbers of SC-FDMA symbols according to CP lengths. The uplink subframe is divided into a control region and a data region in the frequency domain. The data region is allocated with a PUSCH and used to carry a data signal such as audio data. The control region is allocated a PUCCH and used to carry uplink control information (UCI). The PUCCH includes an RB pair located at both ends of the data region in the frequency domain and hopped in a slot boundary.

The PUCCH can be used to transmit the following control information.
  SR (scheduling request): This is information used to request a UL-SCH resource and is transmitted using On-Off Keying (OOK) scheme.
  HARQ ACK/NACK: This is a response to a downlink data packet (e.g. codeword) on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. A HARQ response includes positive ACK (simply, ACK), negative ACK (NACK), DTX (Discontinuous Transmission) or NACK/DTX. Here, HARQ-ACK is used with HARQ ACK/NACK and ACK/NACK interchangeably.
  CSI (channel state information): This is feedback information about a downlink channel. MIMO (Multiple Input Multiple Output)-related feedback information includes a rank indicator (RI) and a precoding matrix indicator (PMI). 20 bits per subframe are used.

The quantity of control information (UCI) that a UE can transmit through a subframe depends on the number of SC-FDMA symbols available for control information transmission. The SC-FDMA symbols available for control information transmission mean SC-FDMA symbols except SC-FDMA symbols of the subframe, which are used for reference signal transmission. In the case of a subframe in which a Sounding Reference Signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 3 shows the mapping relationship between PUCCH formats and UCI in LTE(-A).

TABLE 3

| PUCCH format | UCI (Uplink Control Information) |
|---|---|
| Format 1 | SR (Scheduling Request) (non-modulated waveform) |
| Format 1a | 1-bit HARQ ACK/NACK (SR exist/non-exist) |
| Format 1b | 2-bit HARQ ACK/NACK (SR exist/non-exist) |
| Format 2 | CQI (20 coded bits) |
| Format 2 | CQI and 1- or 2-bit HARQ ACK/NACK (20 bits) (corresponding to only extended CP) |
| Format 2a | CQI and 1-bit HARQ ACK/NACK (20 + 1 coded bits) |
| Format 2b | CQI and 2-bit HARQ ACK/NACK (20 + 2 coded bits) |
| Format 3 (LTE-A) | Up to 24-bit HARQ ACK/NACK + SR |

A description will be given of TDD signal transmission timing in a single carrier (or cell) situation with reference to FIGS. 5 to 11.

Figure 5:
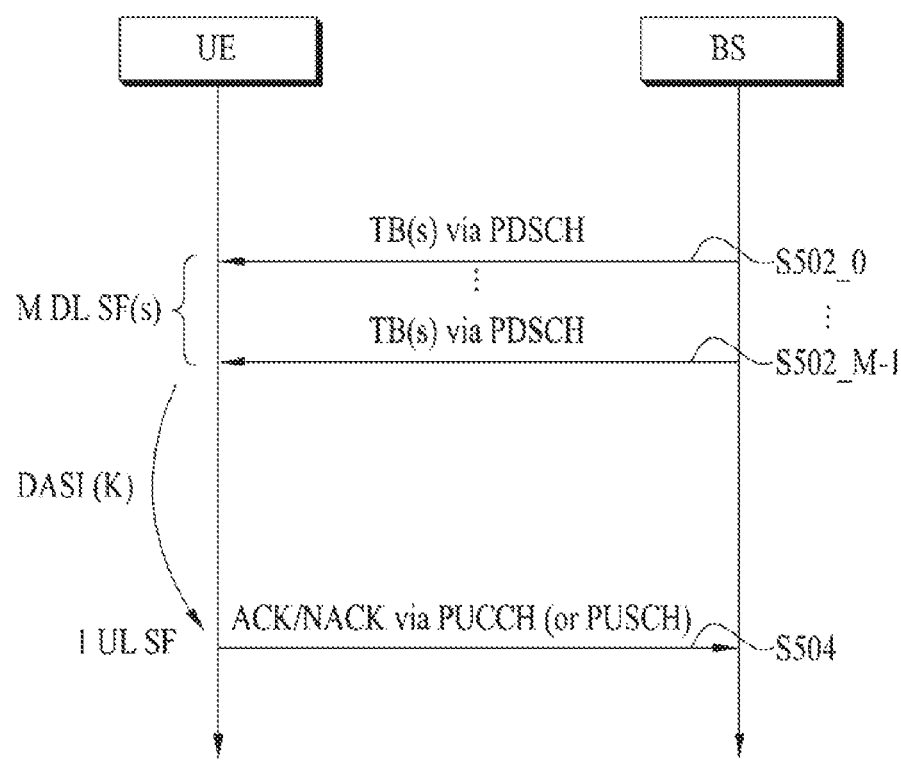
FIGS. 5 and 6 illustrate TDD UL ACK/NACK (Uplink Acknowledgement/Negative Acknowledgement) transmission timing in a single cell case.
Figure 6:
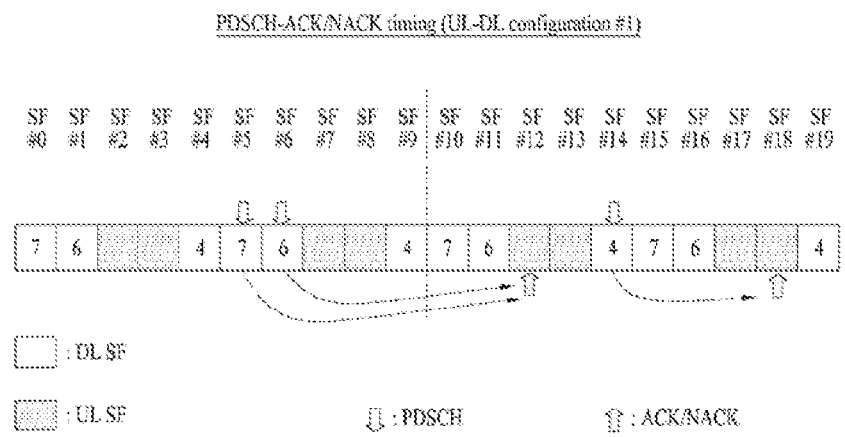

FIGS. 5 and 6 illustrate PDSCH-UL ACK/NACK timing. Here, UL ACK/NACK means ACK/NACK transmitted on uplink, as a response to DL data (e.g. PDSCH).

Referring to FIG. 5, a UE can receive one or more PDSCH signals in M DL subframes (SFs) (S502_0 to S502_M−1). Each PDSCH signal is used to transmit one or more (e.g. 2) transport blocks (TBs) according to transmission mode. A PDCCH signal indicating SPS (Semi-Persistent Scheduling) release may also be received in step S502_0 to S502_M−1, which is not shown. When a PDSCH signal and/or an SPS release PDCCH signal is present in the M DL subframes, the UE transmits ACK/NACK through a UL subframe corresponding to the M DL subframes via processes for transmitting ACK/NACK (e.g. ACK/NACK (payload) generation, ACK/NACK resource allocation, etc.) (S504). ACK/NACK includes acknowledgement information about the PDSCH signal and/or an SPS release PDCCH received in step S502_0 to S502_M−1. While ACK/NACK is transmitted through a PUCCH basically, ACK/NACK is transmitted through a PUSCH when a PUSCH is transmitted at ACK/NACK transmission time. Various PUCCH formats shown in Table 3 can be used for ACK/NACK transmission. To reduce the number of ACK/NACK bits transmitted through a PUCCH format, various methods such as ACK/NACK bundling and ACK/NACK channel selection can be used.

As described above, in TDD, ACK/NACK relating to data received in the M DL subframes is transmitted through one UL subframe (i.e. M DL SF(s): 1 UL SF) and the relationship therebetween is determined by a DASI (Downlink Association Set Index).

Table 4 shows DASI (K: {k0, k1, . . . , kM−1}) defined in LTE(-A). Table 4 shows spacing between a UL subframe transmitting ACK/NACK and a DL subframe relating to the UL subframe. Specifically, when a PDCCH that indicates PDSCH transmission and/or SPS release is present in a subframe n−k (k∈K), the UE transmits ACK/NACK in a subframe n.

TABLE 4

| TDD UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

FIG. 6 illustrates UL ACK/NACK transmission timing when UL-DL configuration #1 is set. In the figure, SF#0 to #9 and SF#10 to #19 respectively correspond to radio frames, and numerals in blocks denote UL subframes relating to DL subframes from the viewpoint of DL subframes. For example, ACK/NACK for a PDSCH of SF#5 is transmitted in SF#5+7 (=SF#12) and ACK/NACK for a PDSCH of SF#6 is transmitted in SF#6+6 (=SF#12). Accordingly, both ACKs/NACKs for DL signals of SF#5/#6 are transmitted in SF#12. Similarly, ACK/NACK for a PDSCH of SF#14 is transmitted in SF#14+4 (=SF#18).

Figure 7:
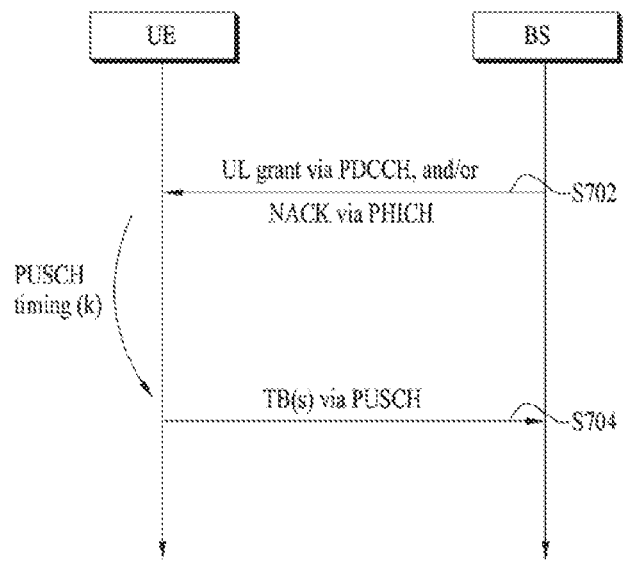
FIGS. 7 and 8 illustrate TDD PUSCH (Physical Uplink Shared Channel) transmission timing in a single cell case.
Figure 8:
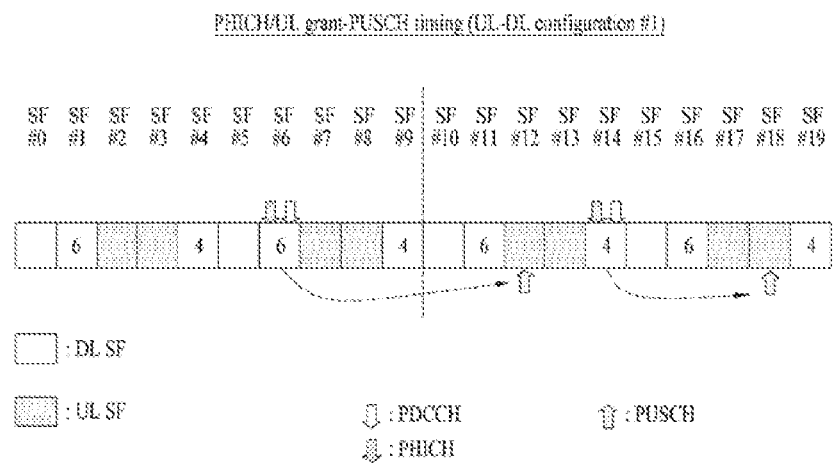

FIGS. 7 and 8 illustrate PHICH/UL grant-PUSCH timing. A PUSCH can be transmitted corresponding to a PDCCH (UL grant) and/or a PHICH (NACK).

Referring to FIG. 7, the UE can receive a PDCCH (UL grant) and/or a PHICH (NACK) (S702). Here, NACK corresponds to an ACK/NACK response to previous PUSCH transmission. In this case, the UE can initially transmit/retransmit one or more TBs through a PUSCH after k subframes via processes for PUSCH transmission (e.g. TB coding, TB-CW swapping, PUSCH resource allocation, etc.) (S704). The present embodiment is based on the assumption that a normal HARQ operation in which a PUSCH is transmitted once is performed. In this case, a PHICH and a UL grant corresponding to PUSCH transmission are present in the same subframe. However, in case of subframe bundling in which a PUSCH is transmitted multiple times through a plurality of subframes, a PHICH and a UL grant corresponding to PUSCH transmission may be present in different subframes.

Table 5 shows a UAI (Unlink Association Index) (k) for PUSCH transmission in LTE(-A). Table 5 shows spacing between a DL subframe from which a PHICH/UL grant is detected and a UL subframe relating to the DL subframe. Specifically, when a PHICH/UL grant is detected from a subframe n, the UE can transmit a PUSCH in a subframe n+k.

TABLE 5

| TDD UL-DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | 4 | 4 | |
| 4 | | | | | | | | 4 | 4 | |
| 5 | | | | | | | 4 | | | |
| 6 | 7 | 7 | | | | | 7 | 7 | | 5 |

FIG. 8 illustrates PUSCH transmission timing when UL-DL configuration #1 is set. In the figure, SF#0 to #9 and SF#10 to #19 respectively correspond to radio frames, and numerals in blocks denote UL subframes relating to DL subframes from the viewpoint of DL subframes. For example, a PUSCH corresponding to PHICH/UL grant of SF#6 is transmitted in SF#6+6 (=SF#12) and a PUSCH corresponding to a PHICH/UL grant of SF#14 is transmitted in SF#14+4 (=SF#18).

Figure 9:
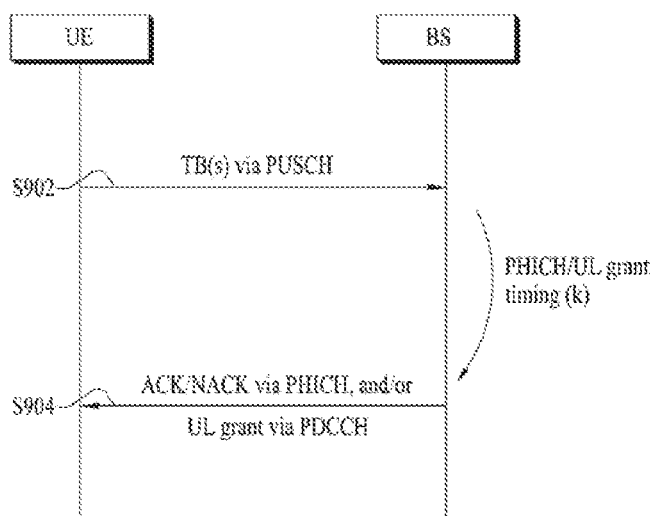
FIGS. 9 and 10 illustrate TDD DL ACK/NACK transmission timing in a single cell case.
Figure 10:
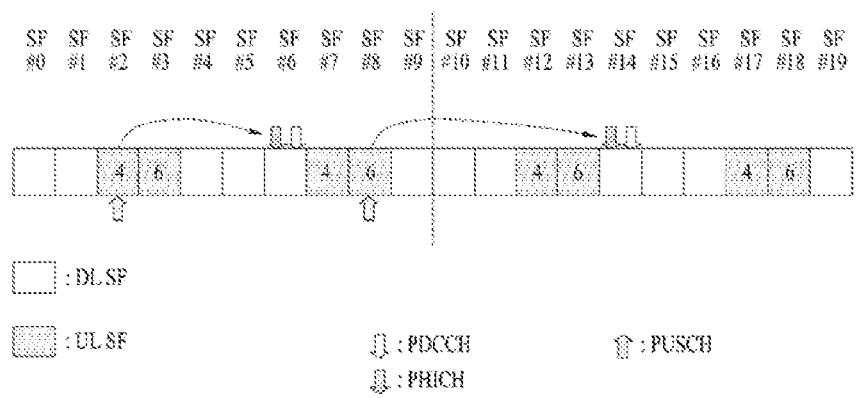

FIGS. 9 and 10 illustrate PUSCH-PHICH/UL grant timing. A PHICH is used to transmit DL ACK/NACK. Here, DL ACK/NACK means ACK/NACK transmitted on downlink as a response to UL data (e.g. PUSCH).

Referring to FIG. 9, the UE transmits a PUSCH signal to the BS (S902). Here, the PUSCH signal is used to transmit one or a plurality of (e.g. 2) TBs according to transmission mode. The BS can transmit ACK/NACK as a response to PUSCH transmission through a PHICH after k subframes via processes for ACK/NACK transmission (e.g. ACK/NACK generation, ACK/NACK resource allocation, etc.) (S904). ACK/NACK includes acknowledgement information about the PUSCH signal of step S902. When a response to PUSCH transmission is NACK, the BS can transmit a UL grant PDCCH for PUSCH retransmission to the UE after k subframe (S904). The present embodiment is based on the assumption that a normal HARQ operation in which a PUSCH is transmitted once is performed. In this case, a PHICH/UL grant used for PUSCH transmission can be transmitted in the same subframe. In case of subframe bundling, however, the PHICH and UL grant used for PUSCH transmission can be transmitted in different subframes.

Table 6 shows a UAI (k) for PHICH/UL grant transmission in LTE(-A). Table 6 shows spacing between a DL subframe in which a PHICH/UL grant is present and a UL subframe relating to the DL subframe. Specifically, a PHICH/UL grant of a subframe i corresponds to PUSCH transmission through a subframe i-k.

TABLE 6

| TDD UL-DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | 6 | | | | 6 | | | |
| 3 | 6 | | | | | | | 6 | 6 | |
| 4 | | | | | | | | 6 | 6 | |
| 5 | | | | | | 6 | | | | |
| 6 | | 6 | 4 | | | 7 | 4 | | | 6 |

FIG. 10 illustrates PHICH/UL grant transmission timing when UL-DL configuration #1 is set. In the figure, SF#0 to #9 and SF#10 to #19 respectively correspond to radio frames, and numerals in blocks denote DL subframes relating to UL subframes from the viewpoint of UL subframes. For example, a PHICH/UL grant corresponding to a PUSCH of SF#2 is transmitted in SF#2+4 (=SF#6) and a PHICH/UL grant corresponding to a PUSCH of SF#8 is transmitted in SF#8+6 (=SF#14).

PHICH resource allocation will now be described. When a PUSCH is transmitted in subframe #n, the UE determines a PHICH resource corresponding to the PUSCH in subframe #(n+$k_{PHICH}$). In case of FDD, $k_{PHICH}$ has a fixed value (e.g. 4). In case of TDD, $k_{PHICH}$ has a value depending on UL-DL configuration. Table 7 shows $k_{PHICH}$ for TDD is equivalent to Table 6.

TABLE 7

| TDD UL-DL Configuration | UL subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

A PHICH resource is provided by [PHICH group index, orthogonal sequence index]. The PHICH group index and the orthogonal sequence index are determined using (i) a lowest PRB index used for PUSCH transmission and (ii) a 3-bit field value for DMRS (Demodulation Reference Signal) cyclic shift. Here, (i) and (ii) are indicated by a UL grant PDCCH.

A description will be given of a HARQ process. The UE executes a plurality of parallel HARQ processes for UL transmission. The plurality of parallel HARQ processes are used to continuously perform UL transmission while the UE waits for HARQ feedback representing whether previous UL transmission has been successful or not. Each HARQ process relates to a HARQ buffer of a MAC (Medium Access Control) layer. Each HARQ process manages the number of transmissions of a MAC PDU (Physical Data Unit) in the buffer, HARQ feedback for the MAC PDU in the buffer, and a state parameter regarding a current redundancy version.

In case of LTE(-A) FDD, the number of UL HARQ processes for non-subframe bundling operation (i.e. normal HARQ operation) is 8. In case of LTE(-A) TDD, the number of UL HARQ processes is set differently according to DL-UL configurations. When subframe bundling is applied, a bundle of PUSCHs configured of 4 contiguous UL subframes is transmitted in FDD and TDD. Accordingly, a HARQ operation/process when subframe bundling is applied is different from the normal HARQ operation/process.

Table 8 shows the number of synchronous UL HARQ processes in TDD.

TABLE 8

| TDD UL-DL configuration | Number of HARQ processes for normal HARQ operation | Number of HARQ processes for subframe bundling operation |
|---|---|---|
| 0 | 7 | 3 |
| 1 | 4 | 2 |

TABLE 8-continued

| TDD UL-DL configuration | Number of HARQ processes for normal HARQ operation | Number of HARQ processes for subframe bundling operation |
|---|---|---|
| 2 | 2 | N/A |
| 3 | 3 | N/A |
| 4 | 2 | N/A |
| 5 | 1 | N/A |
| 6 | 6 | 3 |

In case of TDD UL-DL configurations #1 to #6 and normal HARQ operation, the UE transmits a corresponding PUSCH signal in subframe n+k (refer to Table 5) according to UL grant PDCCH and/or PHICH information upon detection of the UL grant PDCCH and/or PHICH information in subframe n.

In case of TDD UL-DL configuration #0 and the normal HARQ operation, when a UL DCI grant PDCCH and/or a PHICH are detected from subframe n, PUSCH transmission timing of the UE is varied according to conditions. When the MSB (Most Significant bit) of a UL index in DCI is 1 or the PHICH is received through a resource corresponding to $I_{PHICH}=0$ in subframe #0 or #5, the UE transmits the corresponding PUSCH signal in subframe n+k (refer to Table 5). When the LSB (Least Significant bit) of the UL index in the DCI is 1, the PHICH is received through a resource corresponding to $I_{PHICH}=1$ in subframe #0 or #5, or the PHICH is received in subframe #1 or #6, UE transmits the corresponding PUSCH signal in subframe n+7. When both the MSB and LSB in the DCI are set, the UE transmits the corresponding PUSCH signal in subframe n+k (refer to Table 5) and subframe n+7.

Figure 11:
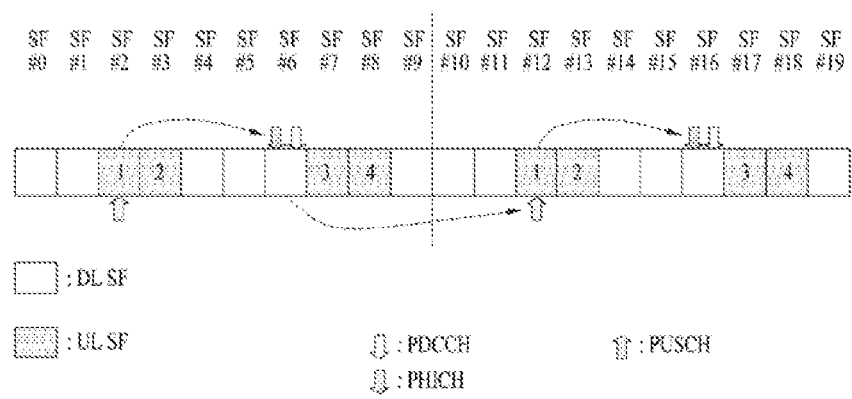
FIG. 11 illustrates a TDD HARQ (Hybrid Automatic Repeat reQuest) process in a single cell situation.

FIG. 11 illustrates a synchronous UL HARQ process when UL-DL configuration #1 is set. Numerals in blocks denote UL HARQ process numbers. The synchronous UL HARQ process shown in FIG. 11 corresponds to a normal HARQ process. Referring to FIG. 11, HARQ process #1 involves SF#2, SF#6, SF#12 and SF#16. For example, if an initial PUSCH signal (e.g. RV=0) is transmitted in SF#2, a UL grant PDCCH and/or a PHICH corresponding to the PUSCH signal can be received in SF#6 and a (retransmission) PUSCH signal (e.g. RV=2) corresponding to the initial PUSCH signal can be transmitted in SF#12. Accordingly, 4 UL HARQ processes having an RTT (Round Trip Time) of 10 SFs (or 10 ms) are present in case of UL-DL configuration #1.

Figure 12:
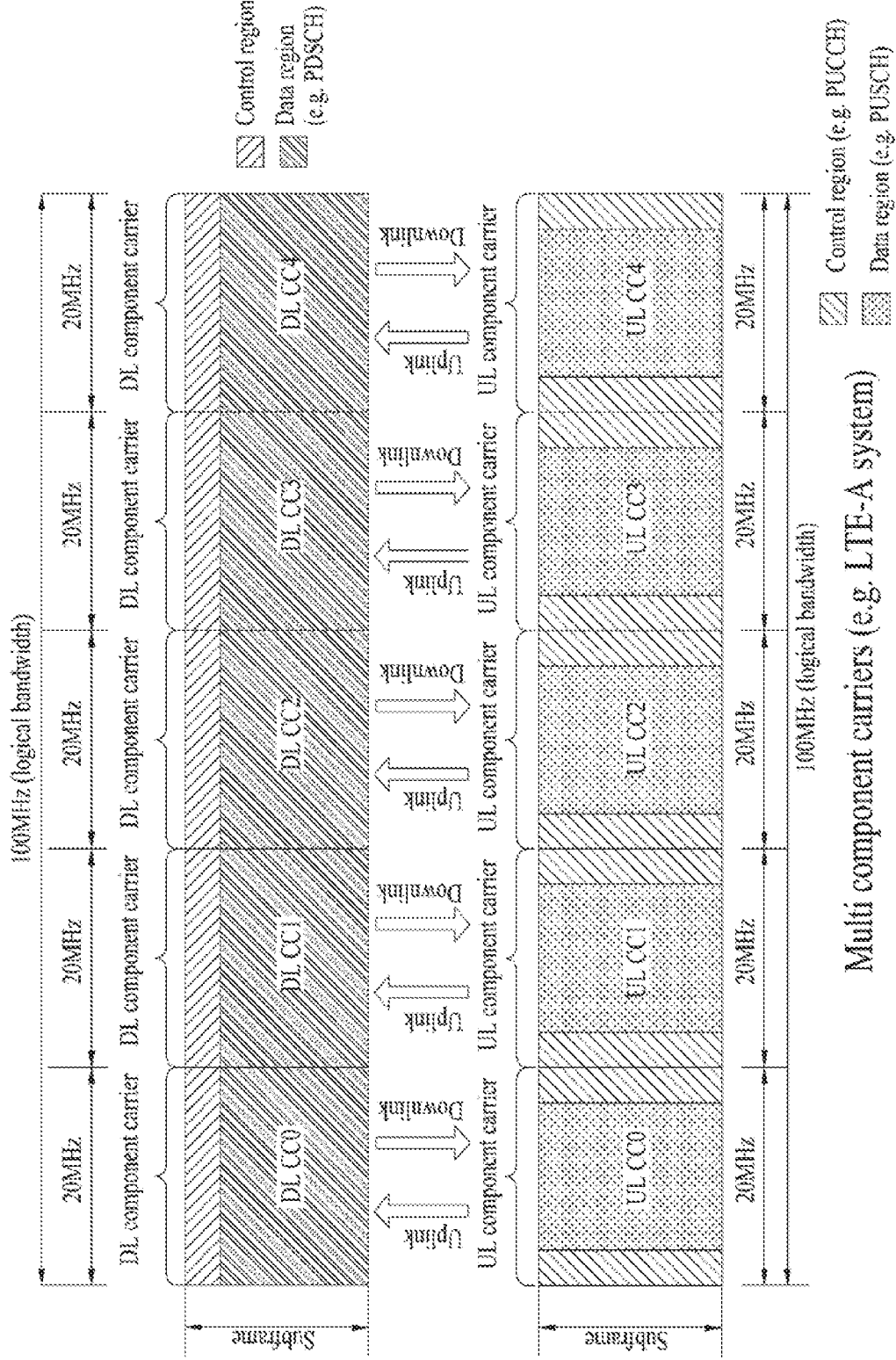
FIG. 12 illustrates a carrier aggregation (CA) communication system.

FIG. 12 illustrates a carrier aggregation (CA) communication system. To use a wider frequency band, an LTE-A system employs CA (or bandwidth aggregation) technology which aggregates a plurality of UL/DL frequency blocks to obtain a wider UL/DL bandwidth. Each frequency block is transmitted using a component carrier (CC). The CC can be regarded as a carrier frequency (or center carrier, center frequency) for the frequency block.

Referring to FIG. 12, a plurality of UL/DL CCs can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. For example, when there are two DL CCs and one UL CC, the DL CCs can correspond to the UL CC in the ratio of 2:1. A DL CC/UL CC link can be fixed or semi-statically configured in the system. Even if the system bandwidth is configured with N CCs, a frequency band that a specific UE can monitor/receive can be limited to M (<N) CCs. Various parameters with respect to CA can be set cell-specifically, UE-group-specifically, or UE-specifically. Control information may be transmitted/received only through a specific CC. This specific CC can be referred to as a Primary CC (PCC) (or anchor CC) and other CCs can be referred to as Secondary CCs (SCCs).

In LTE-A, the concept of a cell is used to manage radio resources. A cell is defined as a combination of downlink resources and uplink resources. Yet, the uplink resources are not mandatory. Therefore, a cell may be composed of downlink resources only or both downlink resources and uplink resources. The linkage between the carrier frequencies (or DL CCs) of downlink resources and the carrier frequencies (or UL CCs) of uplink resources may be indicated by system information. A cell operating in primary frequency resources (or a PCC) may be referred to as a primary cell (PCell) and a cell operating in secondary frequency resources (or an SCC) may be referred to as a secondary cell (SCell). The PCell is used for a UE to establish an initial connection or re-establish a connection. The PCell may refer to a cell operating on a DL CC SIB2-linked to a UL CC. Furthermore, the PCell may refer to a cell indicated during handover. The SCell may be configured after an RRC connection is established and may be used to provide additional radio resources. The PCell and the SCell may collectively be referred to as a serving cell. Accordingly, a single serving cell composed of a PCell only exists for a UE in an RRC_Connected state, for which CA is not set or which does not support CA. On the other hand, one or more serving cells exist, including a PCell and entire SCells, for a UE in an RRC_CONNECTED state, for which CA is set. For CA, a network may configure one or more SCells in addition to an initially configured PCell, for a UE supporting CA during connection setup after an initial security activation operation is initiated.

Figure 13:
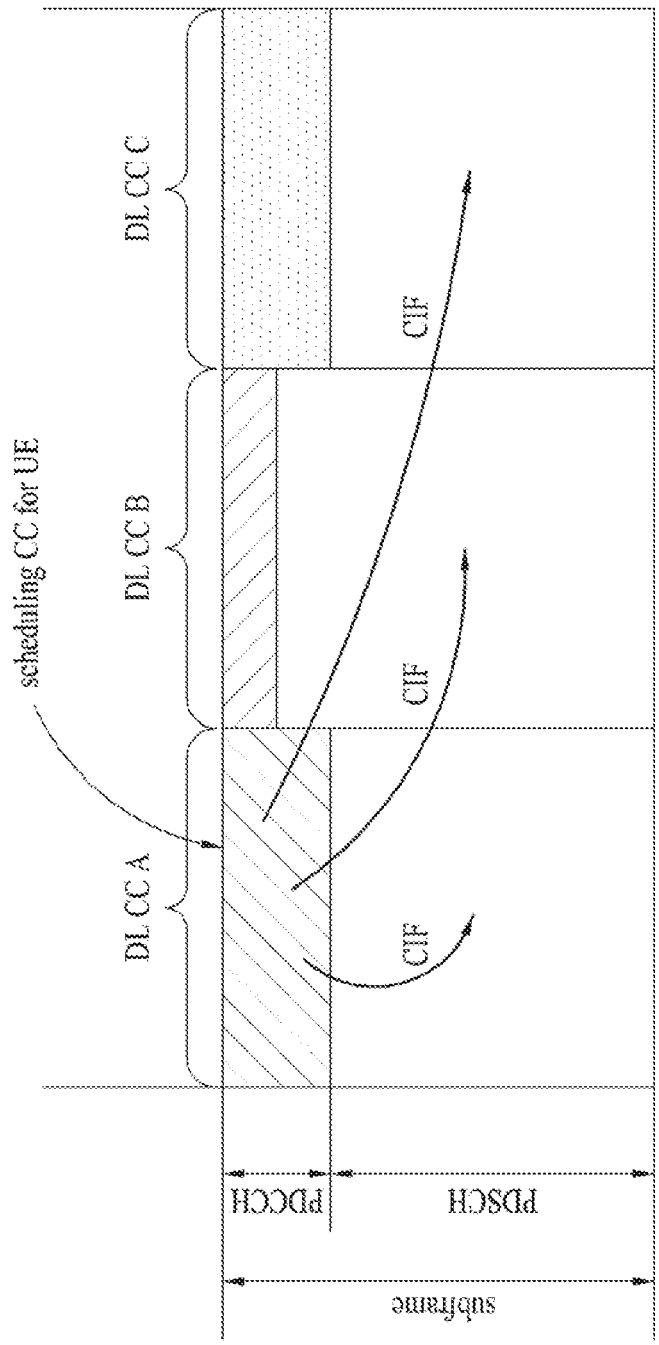
FIG. 13 illustrates scheduling in case of aggregation of a plurality of carriers.

FIG. 13 illustrates scheduling when a plurality of carriers is aggregated. It is assumed that 3 DL CCs are aggregated and DL CC A is set to a PDCCH CC. DL CC A, DL CC B and DL CC C can be called serving CCs, serving carriers, serving cells, etc. In case of CIF (Carrier Indicator Field) disabled, a DL CC can transmit according to the PDCCH rules only a PDCCH that schedules a PDSCH corresponding to the DL CC without a CIF (non-cross-CC scheduling). When the CIF is enabled according to UE-specific (or UE-group-specific or cell-specific) higher layer signaling, a specific CC (e.g. DL CC A) can transmit not only a PDCCH that schedules the PDSCH corresponding to the DL CC A but also PDCCHs that schedule PDSCHs of other DL CCs using the CIF (cross-CC scheduling). A PDCCH is not transmitted in DL CC B/C.

A specific CC (or cell) used for PDCCH transmission is called a scheduling CC (or scheduling cell). The scheduling CC (or cell) may be used with a monitoring CC interchangeably. A CC (or cell) in which a PDSCH/PUSCH is scheduled by a PDCCH of another CC is called a scheduled CC (or scheduled cell). One or more scheduling CCs may be set for one UE and one of the scheduling CCs may be used for DL control signaling and UL PUCCH transmission. That is, a scheduling CC includes a PCC. When only one scheduling CC is set, the scheduling CC corresponds to the PCC.

When cross-CC scheduling is set, CCs carrying signals are defined according to signal type as follows.
 PDCCH (UL/DL grant): scheduling CC
 PDSCH/PUSCH: CC indicated by a CIF of a PDCCH, detected from a scheduling CC
 DL ACK/NACK (e.g. PHICH): scheduling CC (e.g. DL PCC)
 UL ACK/NACK (e.g. PUCCH): UL PCC A conventional CA system considers only a case in which all aggregated CCs operate in the same duplex mode (i.e. FDD or TDD). In addition, the conventional CA system considers only a case in which all aggregated CCs have the same UL-DL configuration when operating in a TDD mode. Accordingly, signal (e.g. UL grant, PHICH, etc.) transmission/reception timing during cross-CC scheduling has no problem because all CCs have the same DL/UL transmission timing in the conventional CA system.

A system following LTE-A considers aggregation of a plurality of CCs operating according to different duplexing schemes. For example, a DL/UL CC pair operating in FDD can be set as a DL/UL PCC pair and a CC operating in TDD can be set as an SCC for optimization of DL/UL control signaling. In this case, DL/UL transmission timing of a CC (e.g. PCC) operating in FDD is different from that of a CC operating in TDD, and thus signal transmission/reception timing may have problems during cross-CC scheduling.

To solve this problem, the present invention proposes a method for setting signal transmission timing when an FDD CC and a TDD CC are aggregated. In addition, the present invention proposes a HARQ process when an FDD CC and a TDD CC are aggregated.

While embodiments of the present invention will be described below on the assumption that two CCs (i.e. an FDD PCC and a TDD SCC) configured to different duplex are aggregated, the embodiments of the present invention can also be applied to a case in which three or more CCs are aggregated and a scheduling CC and a scheduled CC have different duplex modes. In this case, the embodiments of the present invention can be commonly applied to all aggregated CCs, commonly applied to only CC(s) on which cross-CC scheduling is performed, or independently applied to a CC pair (i.e. a scheduling CC and a scheduled CC). Furthermore, the embodiments of the present invention can be applied to aggregation of CC groups having different duplex modes in the same or similar manner. Here, a CC group may include one or more CCs or CC pairs.

It is assumed that a PCC corresponds to a scheduling CC and an SCC corresponds to a scheduled CC in the following description. In addition, it is assumed that the PCC operates in FDD and the SCC operates in TDD. However, this assumption is exemplary and the PCC can operate in TDD and the SCC can operate in FDD. In case of FDD based CC, DL refers to a DL CC and UC refers to a UL CC. Accordingly, PCC DC may refer to a PCC DL CC and PCC UC may refer to a PCC UL CC. In case of TDD based CC, D refers to a DL subframe (SF) or special SF and U refers to a UL SF. Accordingly, SCC D may refer to a DL SF or special SF on an SCC and SCC U may refer to a UL SF on an SCC.

In the following description, "CC" can be used interchangeably with "cell" (or "serving cell"), "PCC" can be used interchangeably with "PCell", and "SCC" can be used interchangeably with "SCell". While a case in which a signal transmission/reception process is performed by a UE is described in the following, this signal transmission/reception process can be applied when a BS (or relay) replaces the UE, except that the UE signal transmission/reception direction is changed.

Embodiment 1: UL Grant Transmission

First, UL grant timing is defined. The UL grant timing may refer to a timing relationship between a UL grant and a PUSCH. For example, the UL grant timing can be defined as a timing interval (unit: SF or ms, for example) between the UL grant and the PUSCH. It is assumed that the UL grant timing is g SF(s) for description. In this case, when the UL grant is received in SF #h, the PUSCH corresponding to the UL grant is transmitted in SF #(h+g). Conversely, when the PUSCH is transmitted in SF #h, the corresponding UL grant is received in SF #(h−g). In a narrow sense, the UL grant timing may refer to UL grant reception timing corresponding to PUSCH transmission. For example, when a PUSCH signal is transmitted in SF #h, the UL grant timing can correspond to SF #(h−g). Accordingly, the UL grant timing can refer to the timing relationship between the UL grant and PUSCH or UL grant transmission/reception time.

In case of FDD based single CC, UL grant timing with respect to a PUSCH transmitted on a UC through SF #h can be fixed to SF #(h−m). Here, m may denote a minimum SF interval (e.g. 4 SFs or 4 ms) between UL grant reception timing and PUSCH transmission timing in response thereto. In case of TDD based single CC, UL grant timing for a PUSCH transmitted on a CC through UL SF #h can be set as DL SF #(h−$k_{UG}$) in the same CC. TDD UL grant timing can refer to FIGS. 7 and 8. Here, $k_{UG}$ can be provided on the basis of a UL SF, in which the PUSCH is transmitted, or defined on the basis of a DL SF, in which the UL grant is received. When $k_{UG}$ is defined on the basis of the DL SF in which the UL grant is received, it can be given as shown in Table 5.

A description will be given of a method for setting UL grant timing when cross-CC scheduling is set in CA based on different duplex modes. The present embodiment is based on the assumption that a PCC operates in FDD and an SCC operates in TDD. Accordingly, DL/UL is present for the PCC for each SF, and UL SF timing is defined for the SCC according to UL-DL configuration (Table 1).

According to the present embodiment, fixed FDD UL grant timing can be applied to PUSCH transmission (referred to as PCC PUSCH hereinafter) on a PCC UC (i.e. non-cross-CC scheduling). That is, when a PUSCH is transmitted on the PCC UC through SF #h, a UL grant corresponding thereto can be received in SF #(h−m) (e.g. m=4) of a PCC DC. For a PUSCH (referred to as SCC PUSCH) transmitted through U (SF #n) of an SCC according to cross-CC scheduling, the following scheme for setting UL grant timing on a PCC DC can be considered.

(1) Method 1-1: FDD UL grant timing (e.g. PCC UL grant timing) can be applied to an SCC PUSCH on a TDD CC. For example, when a PUSCH is transmitted through U (SF #n) of an SCC, a corresponding UL grant can be received through SF #(n−m) of a PCC DC. According to the method of the present embodiment, a delay between the UL grant and PUSCH corresponding thereto can be reduced when the TDD CC operates.

(2) Method 1-2: TDD UL grant timing (e.g. SCC UL grant timing) can be applied to an SCC PUSCH on a TDD CC. For example, when a PUSCH is transmitted through U (SF #n) of an SCC, a corresponding UL grant can be received through SF #(n−$k_{UG}$) of a PCC DC. Here, $k_{UG}$ is provided according to TDD UL-DL configuration (refer to Table 5). According to the method of the present embodiment, existing UL grant-PUSCH timing set according to DL-UL configuration can be reused.

In case of Method 1-2, when a PCC DC includes a UL grant PDCCH, the BS and UE need to set timing of transmitting a PUSCH corresponding to the PDCCH differently according to non-cross-CC scheduling or cross-CC scheduling. To achieve this, the BS and UE can determine UL grant timing using a CIF value of the UL grant PDCCH. For example, the UL grant timing can be determined using m when the CIF value indicates a PCC and determined using $k_{UG}$ when the CIF value indicates an SCC.

Figure 14:
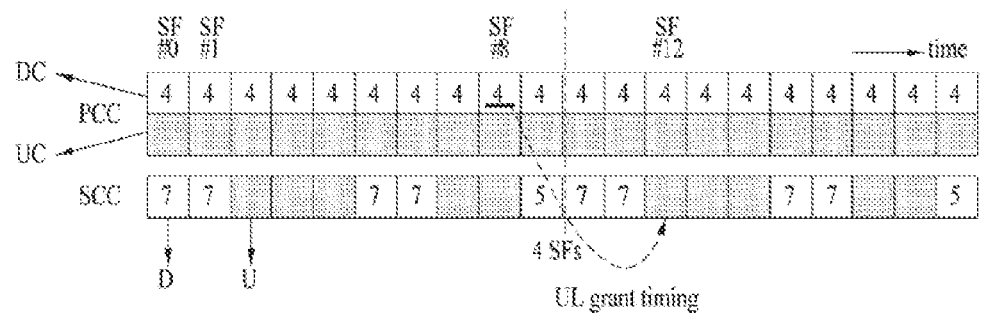
FIG. 14 illustrates UL grant timing according to an embodiment of the present invention.
Figure 14:
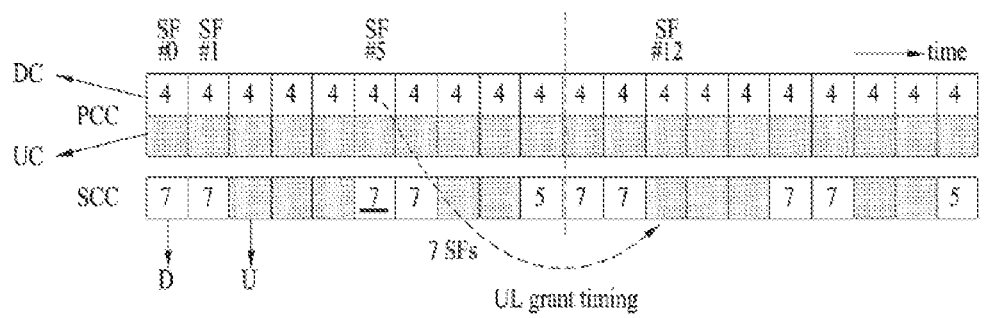

FIG. 14 illustrates UL grant timing according to Methods 1-1 and 1-2. FIG. 14 shows a case in which a PCC and an SCC respectively operate in FDD and TDD DL-UL configuration #6 (Table 1). A numeral affixed to a PCC DC denotes FDD UL grant timing (i.e. m=4) and a numeral affixed to D of the SCC denotes TDD UL grant timing (i.e. $k_{UG}$) (refer to Table 5). According to Method 1-1, when a PUSCH is transmitted through SF #12 of the SCC, a UL grant corresponding to the PUSCH can be received through a PCC DC in SF #(12−4)=SF #8 according to FDD UL grant timing (m=4) set to a PCC UC in SF #12 (refer to FIG. 14(*a*)). According to Method 1-2, when a PUSCH is transmitted in SF #12 of the SCC, a UL grant corresponding to the PUSCH can be received through a PCC DC in SF #(12−7)=SF #5 according to TDD UL grant timing (i.e. $k_{UG}$=7) set to U of the SCC in SF #12 (refer to FIG. 14(*b*)).

In case of Method 1-1, UL grant timing need not be defined in an SF (e.g. SF #(d−m)) of a PCC DC corresponding to a D of SCC(e.g. SF #d). Accordingly, the BS does not transmit a UL grant for an SCC in an SF of a PCC DC corresponding to a D of SCC, and thus the UE can attempt to perform blind decoding to receive a PDCCH. For example, the UE can omit a blind decoding process with respect to a UL DCI format (PUSCH scheduling information) in a search space for the SCC. Here, the search space refers to a resource (area) including a plurality of PDCCH candidates that need to be monitored by the UE. Specifically, the UE can omit an operation (e.g. blind decoding) for receiving a DCI format for a UL grant in SF #(10N+1), SF #(10N+2), SF #(10N+5), SF # (10N+6) and SF #(10N+7) of PCC DC in FIG. 14(*a*). Furthermore, if the SCC corresponds to U in SF #(d−m), the BS can omit even DL grant transmission for the SCC. In this case, the UE can skip a PDCCH reception process (e.g. blind decoding) for the SCC in SF #(d−m) of PCC DC. For example, the UE can skip monitoring of the search space for the SCC in SF #(d−g) of PCC DC. Specifically, the UE can skip a PDCCH reception operation (e.g. blind decoding) for the SCC in SF #(10N+2) and SF #(10N+7) of PCC DC in FIG. 14(*a*). Here, N is an integer greater than 0.

In case of Method 1-2, since UL grant timing is determined based on D of SCC, a UL grant for an SCC PUSCH can be received only in a subframe (e.g. SF #d) in which the SCC corresponds to D. Accordingly, the BS may not transmit the UL grant for the SCC through PCC DC in a subframe in which the SCC corresponds to U, and thus the UE can attempt to perform blind decoding to receive a PDCCH. For example, the UE can skip a blind decoding process with respect to a UL DCI format (PUSCH scheduling information) in a search space for the SCC. Furthermore, the BS may not transmit a DL grant for the SCC through PCC DC in the subframe in which the SCC corresponds to U. Accordingly, the UE can skip a PDCCH reception process (e.g. blind decoding) for the SCC in the subframe in which the SCC corresponds to U. For example, the UE can skip monitoring of the search space for the SCC through PCC DC in the subframe in which the SCC corresponds to U. Specifically, the UE can omit a PDCCH reception process (e.g. blind decoding) for the SCC in SF #(10N+2), SF #(10N+3), SF #(10N+4), SF #(10N+7) and SF #(10N+8) of PCC DC in FIG. 14(*b*).

Embodiment 2: PHICH Transmission

PHICH timing is defined. The PHICH timing may refer to a timing relationship between a PUSCH and a PHICH. For example, the PHICH timing can be defined as a timing interval (unit: SF or ms, for example) between the PUSCH and the PHICH. It is assumed that the PHICH timing is p SF(s) for description. In this case, when the PUSCH is transmitted in SF #h, the PHICH corresponding to the PUSCH is received in SF #(h+p). Conversely, when the PHICH is received in SF #h, the corresponding PUSCH is transmitted in SF #(h−p). In a narrow sense, the PHICH timing may refer to PHICH reception timing corresponding to PUSCH transmission. For example, when a PUSCH signal is transmitted in SF #h, the PHICH timing can correspond to SF #(h+p). Accordingly, the PHICH timing can refer to the timing relationship between the PUSCH and PHICH or PHICH transmission/reception time.

In case of FDD based single CC, PHICH timing with respect to a PUSCH transmitted on a UC through SF #h can be fixed to SF #(h+m). Here, m may denote a minimum SF interval (e.g. 4 SFs or 4 ms) between PUSCH transmission and PHICH reception in response thereto. In case of TDD based single CC, PHICH timing for a PUSCH transmitted through UL SF #h can be set as DL SF #(h+$k_{PHICH}$). TDD PHICH timing can refer to FIGS. 9 and 10, and $k_{PHICH}$ can be provided as shown in Table 7.

A description will be given of a method for setting PHICH timing when cross-CC scheduling is set in CA based on different duplex modes. The present embodiment is based on the assumption that a PCC operates in FDD and an SCC operates in TDD. Accordingly, DL/UL is present for the PCC for each SF, and UL SF timing is defined for the SCC according to UL-DL configuration (Table 1).

According to the present embodiment, fixed FDD PHICH timing can be applied to PUSCH transmission (referred to as PCC PUSCH hereinafter) on a PCC UC (i.e. non-cross-CC scheduling). That is, when a PUSCH is transmitted on the PCC UC through SF #h, a PHICH corresponding thereto can be received in SF #(h+m) (e.g. m=4) of a PCC DC. For a PUSCH (referred to as SCC PUSCH) transmitted through U (SF #n) of an SCC according to cross-CC scheduling, the following scheme for setting PHICH timing on a PCC DC can be considered.

(1) Method 2-1: FDD PHICH timing (e.g. PCC PHICH timing) can be applied to an SCC PUSCH on a TDD CC. For example, when a PUSCH is transmitted through U (SF #n) of an SCC, a corresponding PHICH can be received through SF #(n+m) of a PCC DC. According to the method of the present embodiment, a delay caused by DL ACK/NACK feedback for TDD based PUSCH transmission can be reduced.

(2) Method 2-2: TDD PHICH timing (e.g. SCC PHICH timing) can be applied to an SCC PUSCH on a TDD CC. For example, when a PUSCH is transmitted through U (SF #n) of an SCC, a corresponding PHICH can be received through SF #(n+$k_{PHICH}$) of a PCC DC. Here, $k_{PHICH}$ is provided according to TDD UL-DL configuration (refer to Table 7). According to the method of the present embodiment, existing HARQ processing timing set according to DL-UL configuration can be reused.

A PHICH resource is determined using a lowest PRB index used for PUSCH transmission. Accordingly, PHICH resources may collide when a PUSCH transmitted through an SCC U in SF #n and a PUSCH transmitted through a PCC UC in SF #(n+$k_{PHICH}$−4) use the same lowest PRB index in Method 2-2. To prevent collision of PHICH resources, a PHICH resource corresponding to an SCC PUSCH can be modified using an offset value to determine the PHICH resource. For example, the offset value can be included as a parameter in an equation for determining a PHICH resource index or applied in the form of PHICH resource index+offset.

Figure 15:
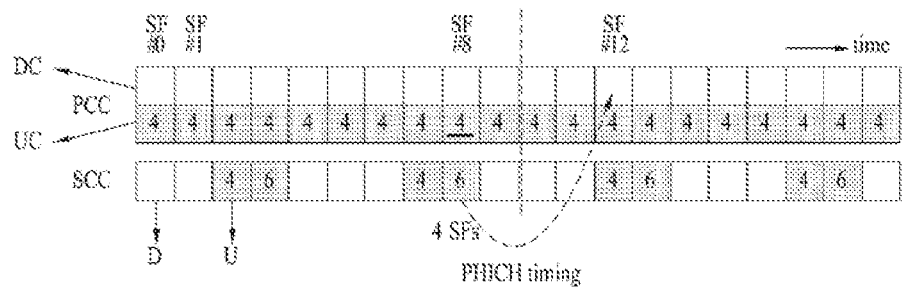
FIG. 15 illustrates PHICH (Physical Hybrid Automatic Repeat and reQuest Indicator Channel) timing according to an embodiment of the present invention.
Figure 15:
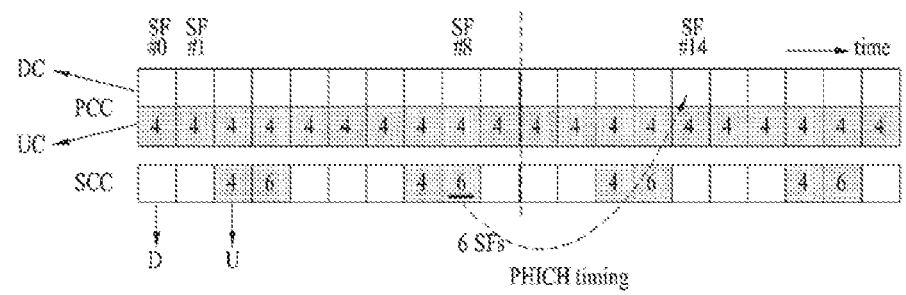

FIG. 15 illustrates PHICH timing according to Methods 2-1 and 2-2. FIG. 15 shows a case in which a PCC and an SCC respectively operate in FDD and TDD DL-UL configuration #1 (Table 1). A numeral affixed to a PCC UC denotes FDD PHICH timing (i.e. m=4) and a numeral affixed to U of the SCC denotes TDD PHICH timing (i.e. $k_{PHICH}$) (refer to Table 7). According to Method 2-1, when a PUSCH is transmitted through an SCC U in SF #8, a PHICH corresponding to the PUSCH can be received through a PCC DC in SF #(8+4)=SF #12 according to FDD PHICH timing set to PCC DC in SF #8 (refer to FIG. 15(*a*)). According to Method 2-2, when a PUSCH is transmitted in SF #8 through U of SCC, a PHICH corresponding to the PUSCH can be received through a PCC DC in SF #(8+6)=SF #14 according to TDD PHICH timing set to U of SCC in SF #8 (refer to FIG. 15 (*b*)).

Embodiment 3: HARQ Process

Considering UL grant timing/PHICH timing described above with reference to FIGS. 7 to 10, a PHICH and UL grant corresponding to the same subframe are allocated to the same HARQ process in a conventional normal HARQ operation. For example, a normal HARQ process in FDD is composed of (initial transmission) PUSCH (SF #n)=>PHICH/UL (retransmission) grant (SF #(n+4))=>(retransmission) PUSCH (SF #(n+8)). Similarly, a normal HARQ process in TDD is composed of (initial transmission) PUSCH (SF #n)=>PHICH/UL (retransmission) grant (SF #(n+$k_{PHICH}$)=>(retransmission) PUSCH (SF #(n+$k_{PHICH}$±$k_{UG}$)). Here, $k_{PHICH}$ and $k_{UG}$ respectively correspond to PHICH timing and UL grant timing.

Accordingly, considering a case to which both Method 1-1 (FDD UL grant timing) and Method 2-1 (FDD PHICH timing) are applied, a HARQ process for a PUSCH (e.g. SCC PUSCH) of a TDD CC can be composed of (initial transmission) SCC PUSCH (SF #n)=>PCC PHICH/UL (retransmission) grant (SF #(n+4)=>(retransmission) SCC PUSCH (SF #(n+8)). That is, in case of the TDD CC, RTT (Round Trip time) of a UL HARQ process can be set as 8 SFs (or ms).

However, it may be efficient to set the RTT of the UL HARQ process as 10 SFs (or ms) or a multiple of 10 SFs (or ms), for example, considering that the TDD SF structure is repeated in the unit of 10 SFs (or ms) and thus the RTT of the UL HARQ process is normally set as 10 SFs (or ms) in TDD. The present embodiment proposes a UL HARQ process configuration scheme in case of TDD CC. The present embodiment is based on the assumption that a PCC operates in FDD and an SCC operates in TDD. The present embodiment exemplifies a normal HARQ process. A HARQ process when subframe bundling is applied is explicitly excluded from the range of the present embodiment.

Specifically, the present embodiment proposes allocation of UL SF #(10N+n) of an SCC PUSCH and SF #(10N+n+m) corresponding to PCC PHICH timing with respect to UL SF #(10N+n) (Method 1-1), and UL SF #(10 (N+1)+n) of the SCC PUSCH and SF #(10(N+1)+n−m) corresponding to PCC UL grant timing with respect to UL SF #(10(N+1)+n) (Method 1-2) to the same UL HARQ process (N=0, 1, . . . ). For example, a UL HARQ process for the SCC can be composed of (initial transmission) SCC PUSCH [SF #n]=>PCC PHICH [SF #(n+m)]=>PCC UL (retransmission) grant [SF #(10+n+m)]=>(retransmission) SCC PUSCH [SF #(10+n)]. Here, m can be set as 4. That is, the present embodiment intentionally provides a time difference of 2 (=(10−2m)) SFs (or ms) between PCC PHICH timing=>PCC UL grant timing in order to set the RTT of the UL HARQ process to 10 SFs (or ms) for the SCC. The number of PUSCH HARQ processes allocated to TDD CC may be set to be equal to the number of UL SFs within 10 SFs (or ms) of Table 1.

The present embodiment is based on the assumption that the RTT of the UL HARQ process with respect to the TDD CC is set as 10 SFs (or ms). However, the RTT of the UL HARQ process in the TDD CC may be greater than 10 SFs (or ms) according to TDD UL-DL configuration or design. Accordingly, the UL HARQ process can be normalized as follows.

(Initial transmission) SCC PUSCH [SF #($R*N+n$)]=>PCC PHICH [SF #($R*N+n+ m$PHICH)]=>PCC UL (retransmission) grant [SF #($R*(N+1)+n−m$UG)]=>(retransmission) SCC PUSCH [SF #($R*(N+1)+n$)]

Here, R denotes the RTT of the UL HARQ process. R is a positive integer. For example, R can be a multiple of 10. N and n are integers greater than 0. mPHICH and mUG respectively correspond to PHICH timing and UL grant timing and are integers greater than 1. mPHICH and mUG may be identical or may be independently defined. Preferably, both mPHICH and mUG can be defined as 4.

Figure 16:
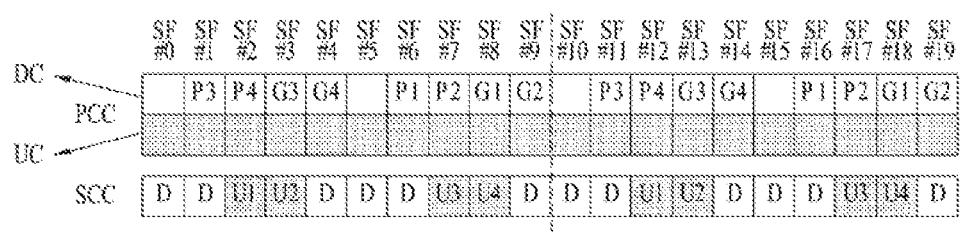
FIG. 16 illustrates a HARQ process according to an embodiment of the present invention.

FIG. 16 illustrates an example of setting UL grant timing and PHICH timing for PUSCH scheduling of a TDD CC (e.g. SCC) according to the present embodiment. The example shows a case in which the SCC corresponds to UL-DL configuration #1 (Table 1). In case of UL-DL configuration #1, 4 UL SFs are included in 10 [SFs or ms], and thus the number of UL HARQ processes allocated to the SCC can be set to 4.

Referring to FIG. 16, UX (PUSCH timing), PX (PHICH timing) and GX (UL grant timing) represent a timing set allocated to UL HARQ process #X. Here, X is an integer indicating a HARQ process index. For example, SCC U (U1) of SF #2, PCC DC (P1) of SF #6, PCC DC (G1) of SF #8, and SCC U (U1) of SF #12 can be allocated to UL HARQ process #1. Accordingly, a PUSCH can be transmitted through an SCC U corresponding to SF #2 and a PHICH corresponding to the PUSCH can be received through a PCC DC corresponding to SF #6. Furthermore, a (retransmission) UL grant can be received through a PCC DC corresponding to SF #8 and a (retransmission) PUSCH corresponding thereto can be transmitted through an SCC U corresponding to SF #12 in the same UL HARQ process. When the UE receives a PHICH through the PCC DC corresponding to SF #6(=#n−6) and/or receives a UL grant through the PCC DC corresponding to SF #8(=#n−4), a PUSCH is transmitted through an SCC U corresponding to SF #12 (=#n). Whether the PUSCH is initially transmitted or retransmitted can be determined according to whether the PHICH has been received and the contents of the UL grant (e.g. whether an NDI (New Data Indicator) has been toggled).

Figure 17:
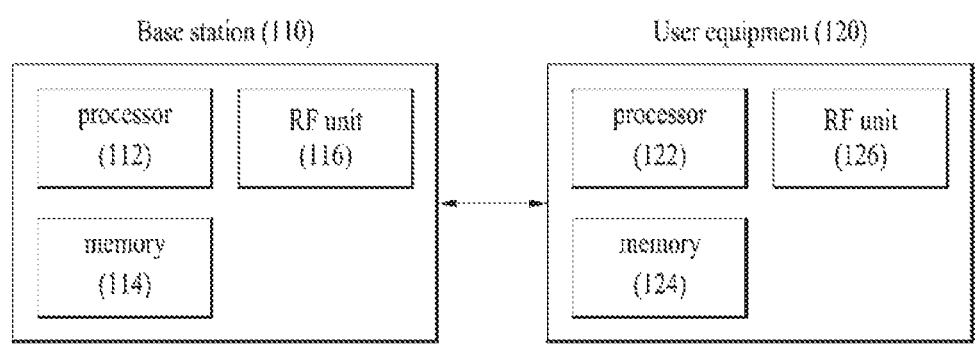
FIG. 17 illustrates a base station (BS) and a user equipment (UE) applicable to an embodiment of the present invention.

FIG. 17 illustrates a BS and a UE applicable to an embodiment of the present invention. When a wireless communication system includes a relay, communication is performed between a BS and the relay on a backhaul link and between the relay and a UE on an access link. The BS or UE shown in FIG. 16 can be replaced by a relay as necessary.

Referring to FIG. 17, an RF communication system includes a BS 110 and a UE 120. The BS 110 includes a processor 112, a memory 114 and an RF unit 116. The processor 112 may be configured to implement the procedures and/or methods proposed by the present invention. The memory 114 is connected to the processor 112 and stores various types of information relating to operations of the processor 112. The RF unit 116 is connected to the processor 112 and transmits and/or receives RF signals. The UE 120 includes a processor 122, a memory 124 and an RF unit 126. The processor 122 may be configured to implement the procedures and/or methods proposed by the present invention. The memory 124 is connected to the processor 122 and stores various types of information relating to operations of the processor 122. The RF unit 126 is connected to the processor 122 and transmits and/or receives RF signals. The BS 110 and the UE 120 may have a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made, centering on a data transmission and reception relationship between a BS and a UE. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to wireless communication apparatuses such as a UE, a relay, a BS, etc.

What is claimed is:

1. A method for transmitting an uplink signal by a User Equipment (UE) according to a HARQ (hybrid automatic repeat and request) operation in a wireless communication system supporting carrier aggregation, the method comprising:

configuring a first cell to FDD (frequency division duplex) and a second cell to TDD (time division duplex);

transmitting an initial PUSCH (physical uplink shared channel) in a first subframe of the second cell;

receiving a PHICH (physical HARQ indicator channel) for the initial PUSCH and a PDCCH (physical downlink control channel) for a retransmission of the initial PUSCH, in a second subframe of the first cell; and transmitting a HARQ retransmission of the initial PUSCH in a third subframe of the second cell, according to the PHICH and the PDCCH received on the first cell.

2. The method of claim 1, wherein the initial PUSCH, the PHICH, the PDCCH and the HARQ retransmission correspond to a same HARQ process.

3. The method of claim 1, wherein the first subframe, the second subframe and the third subframe correspond to a same HARQ process.

4. The method of claim 1, wherein a gap between the first subframe and the second subframe and a gap between the second subframe and the third subframe are set according to a UL(uplink)-DL(downlink) configuration of the second cell.

5. The method of claim 1, wherein the UE is configured to monitor the first cell for scheduling the second cell.

6. A User Equipment (UE) configured to transmit an uplink signal according to a HARQ (hybrid automatic repeat and request) operation in a wireless communication system supporting carrier aggregation, the UE comprising:

a radio frequency (RF) unit; and a processor, wherein the processor is configured to configure a first cell to FDD (frequency division duplex) and a second cell to TDD (time division duplex), to transmit an initial PUSCH (physical uplink shared channel) in a first subframe of the second cell, to receive a PHICH (physical HARQ indicator channel) for the initial PUSCH and a PDCCH (physical downlink control channel) for a retransmission of the initial PUSCH, in a second subframe of the first cell, and to transmit a HARQ retransmission of the initial PUSCH in a third subframe of the second cell, according to the PHICH and the PDCCH received on the first cell.

7. The UE of claim 6, wherein the initial PUSCH, the PHICH, the PDCCH and the HARQ retransmission correspond to a same HARQ process.

8. The UE of claim 6, wherein the first subframe, the second subframe and the third subframe correspond to a same HARQ process.

9. The UE of claim 6, wherein a gap between the first subframe and the second subframe and a gap between the second subframe and the third subframe are set according to a UL(uplink)-DL(downlink) configuration of the second cell.

10. The UE of claim 6, wherein the UE is configured to monitor the first cell for scheduling the second cell.

* * * * *